United States Patent [19]

Yasuda et al.

[11] Patent Number: 4,534,180
[45] Date of Patent: Aug. 13, 1985

[54] ABSORPTION REFRIGERATION SYSTEM WITH SOLUTION FLOW CONTROL

[75] Inventors: Takashi Yasuda; Naoyuki Inoue; Syouji Tanaka, all of Kanagawa, Japan

[73] Assignee: Ebara Corporation, Tokyo, Japan

[21] Appl. No.: 565,195

[22] Filed: Dec. 23, 1983

[30] Foreign Application Priority Data

Dec. 27, 1982 [JP] Japan ................. 57-226656

[51] Int. Cl.³ ............................................. F25B 15/00
[52] U.S. Cl. ........................................ 62/141; 62/147; 62/476
[58] Field of Search .................... 62/141, 147, 476

[56] References Cited

U.S. PATENT DOCUMENTS

| | | | |
|---|---|---|---|
| 3,374,644 | 3/1968 | Foster | 62/141 |
| 3,426,547 | 2/1969 | Foster | 62/141 X |
| 3,452,552 | 7/1969 | Johnson | 62/147 X |
| 3,466,887 | 9/1969 | Eisberg et al. | 62/141 |
| 3,550,391 | 12/1970 | Greacen | 62/147 |
| 3,651,655 | 3/1972 | Dyre | 62/141 X |
| 4,348,868 | 9/1982 | Foster et al. | 62/141 X |
| 4,445,340 | 5/1984 | Reimann | 62/141 |

Primary Examiner—Lloyd L. King
Attorney, Agent, or Firm—Wenderoth, Lind & Ponack

[57] ABSTRACT

An absorption refrigeration system incorporating a novel solution flow control is disclosed. The solution flow control includes a sensor, preferably in the form of a float which senses the level of the solution in the absorber of the system. The signal from the level sensor is utilized to position a valve for controlling the flow of weak solution in such a manner that the solution flow increases/decreases as the level of the solution in the absorber decreases/increases. The solution control not only provides improved efficiency of the refrigeration system but also protects the system from the risk of crystallization of the solution. In one embodiment, a compact solution control is fully enclosed by an airtight shell of the absorber and comprises a float, a rod mechanically and drivingly coupling the float with a solution valve so that the buoyancy of the float directly positions the valve. This arrangement does not need to meet the requirement of having an air tight structure and assures a long life in use.

21 Claims, 10 Drawing Figures

ABSORPTION REFRIGERATION SYSTEM WITH SOLUTION FLOW CONTROL

FIELD OF THE INVENTION

The invention relates to an absorption refrigeration system typically including an evaporator for evaporating refrigerant to produce refrigeration of the fluid to be chilled, an absorber for absorbing refrigerant vapor from the evaporator into an absorbent solution, a generator for concentrating absorbent solution and separating the refrigerant therefrom by heating an absorbent solution, a condenser for condensing refrigerant vapor from the generator, and particularly to a solution flow control for such an absorption refrigeration system.

STATE OF THE ART

In most of the known absorption refrigeration systems, no control is provided which controls the solution flow so that the flow rate of weak absorbent solution passing to the generator is maintained at a substantially constant value irrespective of the condition of operation of the system.

Such a refrigeration system includes a solution passage extending from the generator to the absorber. More specifically, the heated and concentrated or strong solution from the generator passes through a heat exchanger which transfers the heat energy of the strong solution to the weak solution for preheating. The strong solution then passes to the absorber at a spray header which has nozzles.

The capability C of feeding the solution back to the absorber may be expressed as follows:

$$C = (\Delta p + \Delta h) - Hr \qquad (1)$$

wherein $\Delta p$ is the pressure difference between the pressure in the generator ($p_G$) and the pressure in the absorber ($p_A$) i.e. $\Delta p = p_G - p_A$, $\Delta h$ is the position or actual head difference between the generator (at the level of the heated strong solution therein) and the absorber (at the horizontal position of the spray header at the upper position of the absorber), and Hr is the flow resistance of the solution passing through the associated solution passage including the internal passages of the heat exchanger.

The first parameter or pressure difference $\Delta p$ varies considerably depending upon the temperature of the cooling fluid supplied to the condenser and the refrigeration demand or load. This parameter is reduced to a minimum value for the worst condition, that is at the time of a low temperature of the cooling medium in the condenser under a low refrigeration demand. The third parameter Hr also varies considerably depending upon the flow rate, the size of the conduit and the heat exchanger, etc., but must have a predetermined value for the worst condition in order to prevent crystallization of the solution.

From the above, it will be understood that the second parameter or position head difference $\Delta h$ must be chosen at a relatively large value in order that the solution can be fed back to the absorber (i.e. the capability C has a substantial positive valve.) irrespective of the condition of the system operation. Such a large value of the position difference head means that the refrigeration machine must be a large structure, i.e. an excessively tall machine.

In order to avoid this machine size problem, some refrigeration systems utilize an overhead conduit connecting the upper portion of the generator to the lower portion of the absorber. With this arrangement, the main flow path of the solution from the generator to the absorber through the heat exchanger will not operate ($C \leq 0$) under the worst conditions of the system operation, because a positional difference head $\Delta p$ of a relatively small value is chosen. As a result, the level of the heated solution in the generator will increase until the solution communicates with the overhead conduit which then allows the solution to be fed back to the absorber. The operation of the overhead conduit is disadvantageous because the heated and strong solution passing therethrough is not utilized as a heating medium for the weak solution in the heat exchanger or an absorbent medium for the refrigerant vapor formed in the evaporator.

Both of the above-mentioned refrigeration systems are disadvantageous in that the efficiency of the system is relatively low when the refrigeration demand or load on the system is relatively low because these systems are designed to allow a substantially constant solution flow regardless of the system condition.

The required heat input to the generator is generally expressed as follows:

$$Q \times (W \times \Delta i) - (LH \times S) \qquad (2)$$

wherein Q is the heat input to the generator, W is the flow of solution to the generator, $\Delta i$ is the increment of enthalpy due to the heating of the solution, LH is the latent heat of the the refrigerant, and S is the amount of refrigerant separated from the solution.

The second term ($LH \times S$) which relates to the separated refrigerant is efficiently utilized to produce refrigeration of the fluid to be chilled in the evaporator. On the other hand, the first term ($W \times \Delta i$) indicates an unavailable energy.

As is obvious from the equation (2), if the solution flow W is constant as is experienced by the mentioned refrigeration systems, the ratio of the heat input Q with the second term ($LH \times S$), which relates to the coefficient of the system performance, decreases as the refrigeration demand decreases because the first term as unavailable energy does not decrease correspondingly.

A typical absorption refrigeration system of this type which employs a method of constant solution flow is disclosed in U.S. Pat. No. 3,466,887.

In order to improve the low efficiency problem at a relatively low load, there has been developed an absorption refrigeration system which includes control means for controlling the solution flow to the generator in accordance with the condition of the load. The control means typically comprises a sensor which senses the temperature of the fluid (e.g. water) to be chilled and supplies a corresponding signal to an actuator for a valve disposed in the passage of the absorbent solution to the generator. At low temperatures (i.e. low loads), the valve allows a limited flow of the solution, thus improving the efficiency.

The relationship between the weak solution flow W to the generator and the quantity of the refrigerant S separated therefrom is expressed as follows:

$$S = \{1 - (\xi_1/\xi_2)\}W \qquad (3)$$

wherein $\xi_1$ is the concentration of absorbent of the weak solution and $\xi_2$ is the concentration of the strong solution from the generator.

For a given load, the quantity of the separated refrigerant will be given at a determined value. Under this condition, if the solution flow W is reduced, the concentration difference ($\xi_2 - \xi_1$) between the weak and strong solutions increases. An excessively concentrated solution will result in crystallization.

Since the last mentioned refrigeration system, which modulates the weak solution flow depending only upon the required load ($Q_E$), does not utilize parameters directly or indirectly related to the concentration of the solution, the system has some risk of crystallization, especially when the condition of the system is at its worst (e.g. high temperature of cooling medium for the absorber and some leakage of air into the system).

While the refrigeration system of this type is intended to increase the efficiency of heat energy conversion, there remains room for improvement.

The refrigeration system of this type is disclosed in U.S. Pat. No. 3,550,391.

SUMMARY OF THE INVENTION

It is an object of the present invention to provide improved control of an absorption refrigeration system which obviates the above-mentioned problems.

Another object of the present invention is to provide a compact absorption refrigeration system.

Another object of the present invention is to provide an absorption refrigeration system which has improvement in efficiency and is safer from the risk of crystalization of the solution.

A still further object of the present invention is to provide a control system for an absorption refrigeration machine which modulates the weak solution so that a high efficiency of the refrigeration system may be achieved without producing the problem of crystallization.

A further object of the present invention is to provide a control system for an absorption refrigeration machine which is built-in within the absorber, thus obviating the problem of air leakage from the control device to assure a long life in use.

In accordance with the invention, there is provided a control system for an absorption refrigeration machine which comprises sensing means for sensing the level of the solution in the absorber, control valve means disposed in the absorbent solution passage connecting the absorber to the generator for allowing a controlled flow of the absorbent solution, and actuator means responsive to the sensing means for controlling the valve in such a manner that the flow of the absorbent solution is reduced as the level of the solution in the absorber increases.

It has been found that the level of the solution in the absorber is a function of the concentration of the solution.

It should be noted that the present control system monitors indirectly the concentration of the solution by sensing the level of the solution in the absorber.

When the level of the solution in the absorber is relatively low, this means that the quantity of refrigerant liquid in the evaporator is relatively large because it is assumed that the total quantity of the solution in the absorber and of the refrigerant liquid in the evaporator is maintained at a substantially constant value throughout the operation.

A relatively large amount of refrigerant liquid in the evaporator sump will indicate that the concentration of the solution is relatively high. Therefore, when the level of the solution in the absorber is relatively low, the concentration thereof will be relatively high. On the contrary, when the level of the solution in the absorber is relatively high, this normally indicates a relatively low concentration in absorbant of the solution.

In accordance with the control system of this invention, the weak solution flow from the absorber to the generator is reduced for relatively high levels of the solution in the absorber (that is when the solution indicates a relatively low concentration). The reduction in the weak solution flow serves to increase the efficiency of the system. A greater quantity of the weak solution flows to the generator when the solution in the absorber bed is at a relatively low level (that is when the solution is fairly concentrated of absorbent).

It will now be understood that the control system of this invention keeps the refrigeration system free from crystallization of the solution because the solution flow is reduced only when the solution has a relatively low concentration of absorbent.

A float type level sensor may be preferably used as the sensing means for sensing the level of the solution in the absorber.

It is preferred that the actuator means and the control valve means are housed in the absorber because such a built-in structure obviates the problem of fluid leakage from the control devices. In other words, such built-in control devices do not need to meet the requirement of being air-tight.

The built-in control devices can be advantageously arranged in such a manner that a rod mechanically and drivingly connects the float with the control valve so that the buoyancy of the float directly controls the opening of the valve. This structure is compact and economical.

BRIEF DESCRIPTION OF THE DRAWINGS

The above and other objects, features and advantages of the present invention will be apparent from the following descriptions in conjunction with the accompanied drawings in which.

DETAILED DESCRIPTION OF THE PREFERRED EMBODIMENTS

Figure 1:
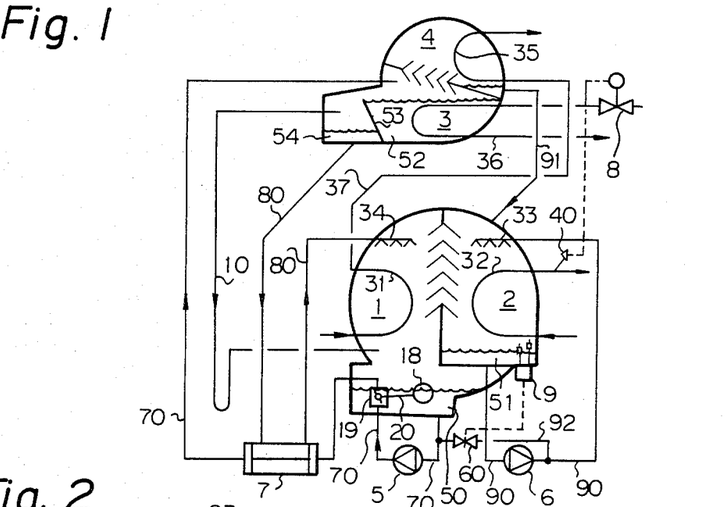
FIG. 1 is a schematic representation of a single effect absorption refrigeration system incorporating a solution control in accordance with the present invention.

Referring first to FIG. 1, there is shown a single effect absorption refrigeration system incorporating a solution control in accordance with the present invention. The absorption refrigeration system comprises an absorber 1, a refrigerant evaporator 2, a single generator 3, a refrigerant condenser 4. The absorber 1 and the evaporator 2 may be preferably arranged side by side in a common fluid tight shell as shown. Similarly, the generator 3 and the condenser can be disposed in a common fluid tight shell as shown. While various types of refrigerants and absorbents may be used in the present invention, a preferable refrigerant is water and a preferred absorbent is lithium bromide.

The evaporator 2 has an evaporator heat exchanger 32 for passing a fluid medium such as water to be chilled by evaporating refrigerant. The fluid is circulated through a suitable load (not shown). The lower portion of the evaporator 2 defines a refrigerant sump 51 for the accumulation of refrigerant liquid. From the bottom of the evaporator, the refrigerant liquid passes through refrigerant passage 90 and is pumped by a refrigerant pump 6 to spray headers 33 which discharge refrigerant liquid over the evaporator heat exchanger 32 to remove heat from the fluid to be chilled.

The absorber 1 has a heat excager 31 for passing a cooling fluid such as water which is cooled typically by evaporation in a cooling tower (not shown). The cooling fluid serves to cool the absorbent solution which absorbs refrigerant vapor from the evaporator 2. The lower portion of the absorber 1 forms an absorber sump 50 for the accumulation of "weak" absorbent solution which has been weakened or diluted by refrigerant vapor absorption. The weak solution from the absorber sump 50 passes through a weak solution passage 70 and is pumped by a weak solution pump 5 through the internal passage of a solution heat exchanger 7 to the generator 3 for concentration therein.

The generator 3 has a heat exchanger 36 for passing a heating medium which serves to concentrate the solution by boiling or separating the vaporized refrigerant from the solution. In FIG. 1, the heating medium is shown as steam. Any other suitable heating media, such as hot water or combustion gas from a gas burner may be employed.

A partition 53 and a lower portion of the generator forms a generator solution sump 52. The heated and concentrated (strong) solution flows over the partition 53 and is accumulated in a strong solution sump 54. The strong solution from the bottom of the sump 54 passes through strong solution passage 80 and through the solution heat exchanger 7 for preheating of the weak solution. The strong and cooled solution further passes through strong solution passage 80 to spray headers 34 which discharge strong solution over the absorber heat exchanger 31.

Whereas the partition 53 is suitable for the accumulation of the fully heated and strong solution only in the sump 54, these two elements can be omitted if desired. In that case, the strong solution passage 80 will extend a substantial height above the bottom shell of the main sump 52.

The condenser 4 has a condenser heat exchanger 35 for passing a cooling medium such as water. In the illustrated embodiment, a common cooling medium passage 37 including the absorber heat exchanger 31 disposed upstream and the condenser heat exchanger 35 disposed downstream is conveniently used. A separate cooling medium passage can be used if desired. Refrigerant vapor separated from absorbent solution in the generator 3 passes into condenser 4 and is condensed by the cooling medium of the heat exchanger 35. The condensed refrigerant passes through a refrigerant liquid passage 91 into the sump 51 of the evaporator 2.

There is provided a heating medium control which controls the passage of heating medium to the generator in accordance with the required refrigeration load. More specifically, the heating medium control comprises a temperature sensor 40 disposed at the output line from the evaporator heat exchanger 32. The sensor 40 produces a control signal which is a function of the refrigeration demand imposed on the system. The control signal is applied to position a control valve 8 for the heating medium, in this case steam, so that the flow of steam is proportionally controlled in accordance with the refrigeration load.

There is provided a refrigerant liquid bypass control which bypasses refrigerant liquid to the absorbent solution line when the refrigerant accumulation in the evaporator sump 51 exceeds a predetermined level. More specifically, the refrigerant liquid bypass control comprises a level sensor 9 which produces a signal upon accumulation of refrigerant in the sump 51 in excess of the predetermined level. This control signal is utilized to open a bypass valve 60 disposed in a bypass passage 92 connecting the outlet of the refrigerant pump 6 to the weak solution passage 70 so that an excess of refrigerant liquid passes into the weak solution line.

An overhead passage 10 is provided which connects the middle portion of the generator 3 to the lower portion of the absorber 1. This passage 10 is utilized mainly for fail safe purposes.

In accordance with the present invention, there is provided a solution control which varies the flow of the absorbent solution to the generator 3 from the absorber 1 in relation to the level of the absorbent solution in the absorber sump 50.

More specifically, the absorbent solution control comprises level sensing means for sensing the level of the solution in the absorber sump. Whereas various types of level sensors can be used, a float type sensor 18 is preferable. The absorbent solution control further comprises a valve 19 disposed in the weak solution passage 70 extending from the absorber 1 to the generator. The valve 19 controls the flow of the weak absorbent solution passing through the weak solution passage 70 in response to the signal from the absorber sump level sensing float 18. As a result, the valve is positioned in such a manner that the flow of the solution increases when the level of the solution in the absorber sump 50 decreases whereas the flow of the solution decreases when the level of the solution in the absorber sump 50 increases. It should be noted that in the illustrated embodiment in FIG. 1, the solution control valve 19 is disposed within the air tight cell of the absorber and the evaporator. With this arrangement, the valve 19 does not need to satisfy the requirement of an air tight structure requirement and can be of economical design.

A rod 20 mechanically and drivingly connects the float 18 to the solution valve 19 so that the float 18 functions as an actuator for the valve 19 by transmitting its buoyancy to position the valve through the connecting rod 20. The solution control as described and shown in FIG. 1 has advantages in simplicity, compactness and low cost. Leakage of solution from the valve would not create a significant problem which would lead to a system failure because the valve is enclosed by the fluid tight shell.

Figure 2:
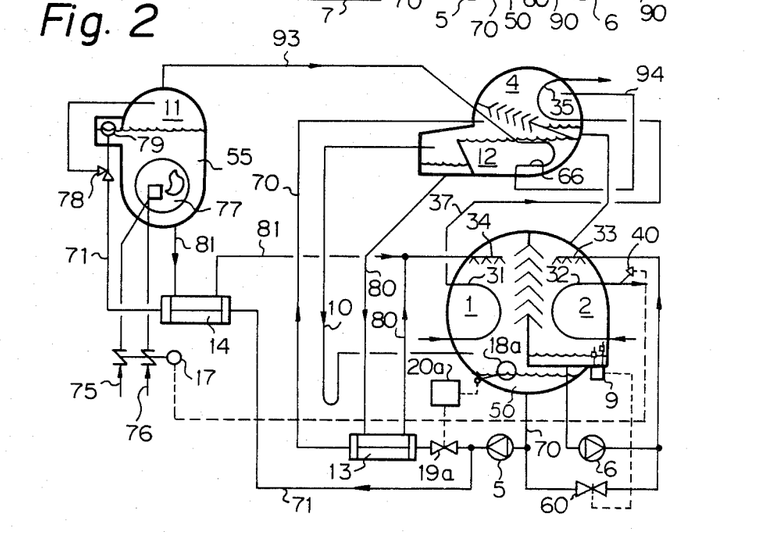
FIG. 2 is a schematic representation of a double effect absorption refrigeration system incorporating a modified solution control in accordance with the present invention.

Referring now to FIG. 2, there is shown a solution control in accordance with the present invention which is applied to a double effect refrigeration system. Like components are identified by like numerals in FIGS. 1 and 2. Since the refrigeration system in FIG. 2 is of the double effect type, the system includes a first stage or high pressure generator 11 and a second stage or low pressure generator 12. The high pressure generator 11 has a heat exchanger 77 passing heat medium which is shown in the form of combustion gas from a gas burner connected to an air line 75 and a fuel line 76.

The temperature senser 40 senses the temperature of fluid being chilled as it leaves evaporator 2. The control signal from the sensor 40 is supplied to an actuator 17 which correspondingly positions a fuel valve and an air valve disposed in the fuel line 76 and the air line 75, respectively, thus controlling the heat produced by the gas burner. The generator heat exchanger 77 boils the absorbent solution in exchanger sump 55 to concentrate the solution and separate the refrigerant from the solution. The hot refrigerant vapor from the first stage generator passes through a refrigerant passage 93 to the second stage or low pressure generator 12 and is utilized as a heating medium for the solution therein by a second stage generator heat exchanger 66. The refrigerant from the heat exchanger 66 passes through a refrigerant passage 94 to the refrigerant condenser 4.

A passage 71 extends from the outlet of the solution pump 5 to the first stage generator 11 through the internal passage of a solution heat exchanger 14, whereby the passage 71 passes the weak solution from the absorber 1 to the first stage generator 11. A float 79 disposed in the first generator sump 55 controls a valve 78 disposed in the passage of weak solution to the first stage generator 11 so as to maintain the level of solution in the first generator sump.

The hot concentrated solution from the first generator 11 passes through a passage 81 via the solution heat exchanger 14 for preheating of the dilute solution and passes to the spray headers 34 which discharge the solution as described above.

The double effect refrigeration system shown in FIG. 2 incorporates a solution control in accordance with the present invention. The illustrated solution control comprises a float 18a (corresponding to float 18 in FIG. 1) which provides a control signal (electric or pneumatic) in accordance with the level of solution in the absorber sump 50. The control signal from the float is applied to an actuator 20a which responsively positions a valve 19a disposed in the dilute solution passage between the outlet of the solution pump 5 and the inlet of the solution exchanger 13.

It will now be understood that the solution flow control in accordance with the present invention has various advantages.

Firstly, the refrigeration machine can be made compact because a relatively small positional head difference $\Delta h$ is sufficient for the solution to circulate through the absorber and the generator with a relatively high energy conversion efficiency. More specifically, when the pressure in the generator decreases, i.e. $\Delta p$ (see equation (1)) decreases, this will increase the level of the solution in the absorber sump. Under this condition, the solution flow control of this invention controls the solution valve to restrict the flow of the weak solution to the generator. Responsively, the flow of strong solution back to the absorber from the generator decreases, thus reducing the flow resistance Hr passing through the solution exchanger and the associated passage. The reduction of the flow resistance Hr serves to cancel at least part of the reduction of the generator pressure $P_G$. This is a feed-back effect as produced by the solution flow control of the present invention. In addition, the reduction of the solution flow serves to increase the heat transfer by the solution exchanger, i.e. the weak solution is sufficiently preheated through the exchanger before it passes into the generator whereas the strong solution is sufficiently cooled before it passes into the absorber. Further, the reduced flow of solution increases the quantity of refrigerant, formed in the generator, per unit heat input to the generator, as is apparent from the equation (2).

On the other hand, when the concentration of the solution is relatively high, this will reflect a relatively low level of the solution in the absorber. Under this condition the solution control of this invention positions the valve to allow an increased flow of the weak solution. This protects the refrigeration system from the risk of crystallization which would be caused by overconcentration of the solution at a relatively low flow rate of solution.

The advantages of the present invention will be discussed later in greater detail in comparison with the prior art flow control which controls the solution flow depending only on the refrigeration demand.

COMPARISON WITH OTHER PARAMETERS FOR SENSING

In accordance with the present invention, the level of solution in the absorber sump is utilized as a parameter to be sensed. While various other parameters could be proposed as objects to be sensed, they have disadvantages over the method of sensing the absorber solution level by this invention.

Other parameters which might be sensed are as follows:

(a) The level of solution in the generator,
(b) The level of solution in a return passage to the generator, and
(c) The pressure in the generator.

Regarding (a), it is customarily determined that the total amount stored in the machine is limited by a value which just matches the requirement under full load operation, because solution is expensive. Correspondingly, there is also a limited difference in level between that under the condition of full load and that which subsists when the capability of feeding the solution back to the absorber is small. Also the level of solution at which the overflow passage operates should not be higher than the level of solution under the full load condition. As a result, the level of the solution in the generator cannot change above a determined height, thus imparting difficulty in sensing. Regarding (b), this level violently changes and is not suitable to act as a sensing point. Regarding (c), sensing means and control means will be complicated and expensive. Further this method cannot sense the concentration of the solution.

In contrast, the method of sensing the level of solution in accordance with the present invention includes the following advantages:

(A) High sensibility is assured because the level of solution in the absorber changes significantly, (B) No violent changes in level, (C) Thermal influence on the float is minimized because the temperature of the absorber solution is relatively low, and (D) In case of fluid (air) leakage, the level of absorber solution decreases so that the flow of absorbent solution increases to prevent crystallization of the strong solution.

COMPARISON WITH THE PRIOR ART

Figure 3:
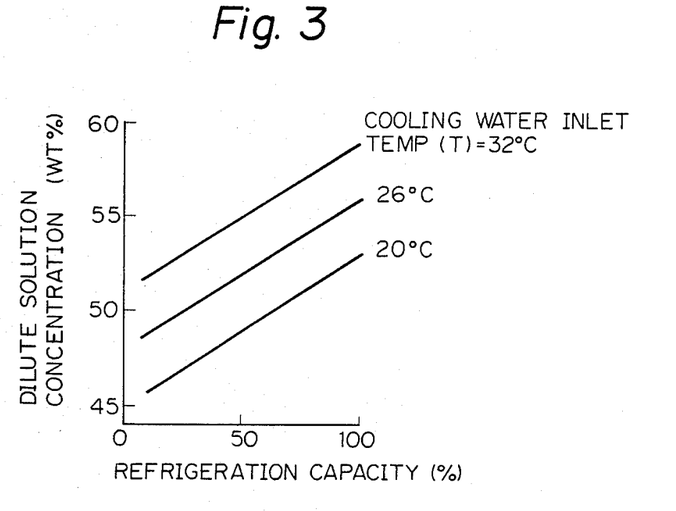
FIG. 3 is a graph illustrating an example of weak solution VS refrigeration capacity characteristics for different temperatures of cooling water entering an absorber exchanger in an absorption refrigeration system.
Figure 4:
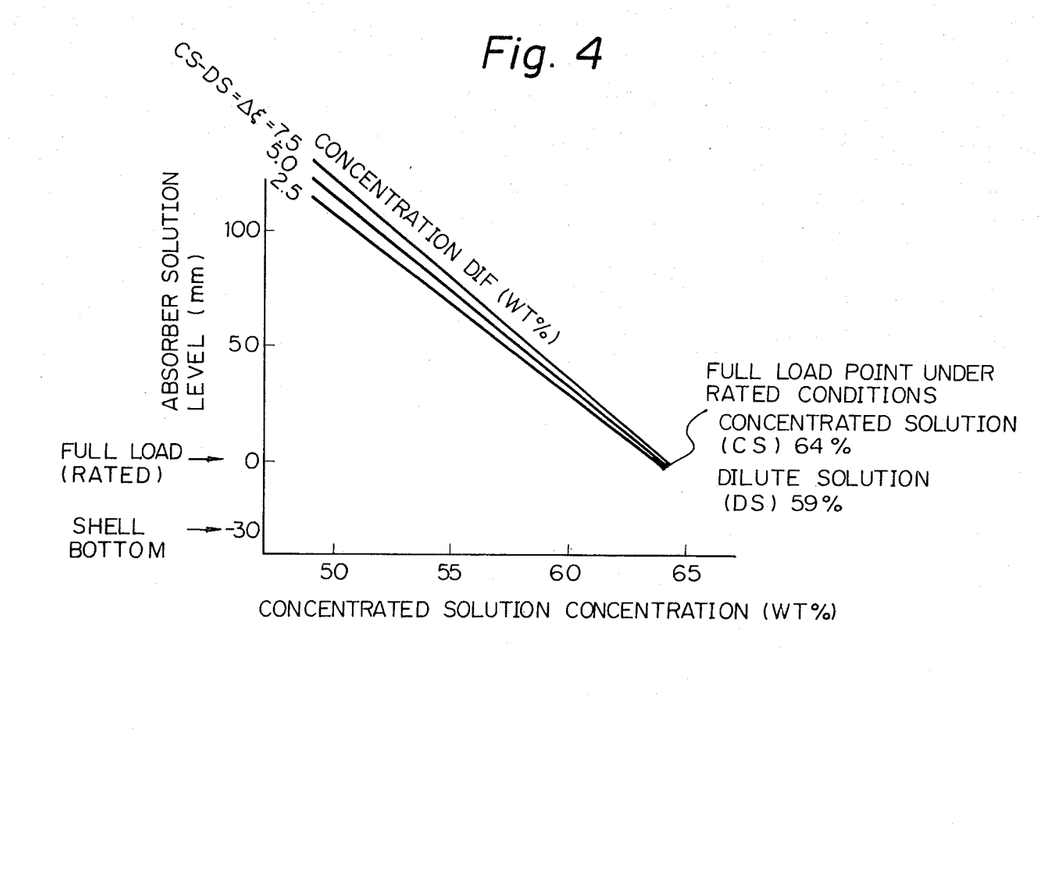
FIG. 4 is a graph illustrating a relationship between the concentration of solution and the solution level of the absorber.

FIGS. 3 and 4 show a typical example of characteristics of absorption refrigeration systems. These characteristics do not depend on the solution control to be used, but rather depend on the structure of the refrigeration machine, the area of heat transfer, etc.

It will be appreciated from FIG. 3 that the dilute solution (e.g. in the absorber sump 50 in FIG. 1) linearly increases in concentration as the refrigeration capacity or demand increases. Further it is noted that for higher temperatures of cooling water entering (such as supplied to the absorber heat exchanger 31 in FIG. 1), a more concentrated solution is required to satisfy the same refrigeration load.

It will be appreciated from FIG. 4 that the level of the solution in the absorber sump is generally in inverse proportion to the concentration of solution. In FIG. 4, $\Delta\xi$ indicates the concentration difference between concentrated or strong solution and dilute or weak solution.

Figure 5:
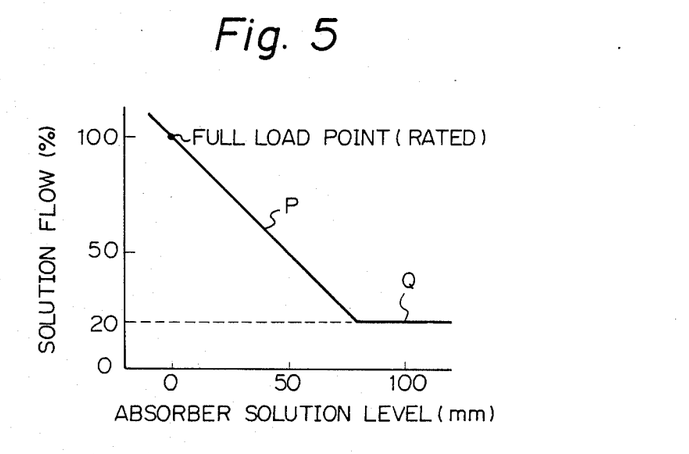
FIG. 5 is a graph illustrating an example of solution flow characteristics obtained by a solution control in accordance with the present invention.

FIG. 5 shows an example of solution flow characteristics as obtained by the solution control in accordance with the present invention. In FIG. 5, a point defined by 100% solution flow and 0 mm of absorber solution level indicates a 100% refrigeration load point under rated conditions (e.g. temperature of cooling water entering (T)=32° C. and temperature of chilled water leaving (T)=6° C.). A line segment P indicates a proportional control by which the flow of weak solution decreases as the level of absorber solution proportionally increases. Such a proportional control can be implemented by the use of a double-seat valve with appropriate part characteristics.

When the absorber solution goes up to a predetermined level (approximately 75 mm in FIG. 5), the valve is positioned to allow a minimum flow of solution (app. 20% in FIG. 5), as indicated by a line segment Q. This minimum flow is maintained for levels above the predetermined level in order to avoid over-concentration of solution in the generator.

Any suitable flow characteristics can be obtained by using other valve types such as single seat valves, or butterfly valves having different port characteristics.

Figure 6:
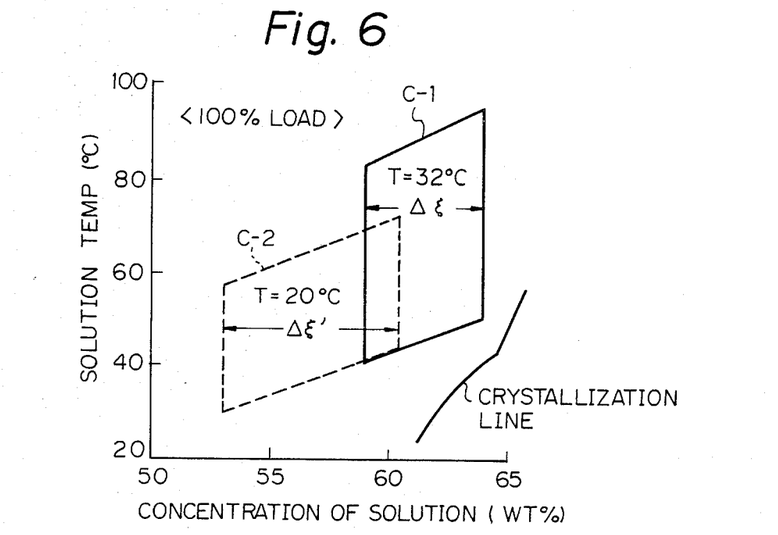
FIG. 6 is a graph illustrating refrigeration cycles obtained by the solution control of the present invention under full refrigeration load.
Figure 7:
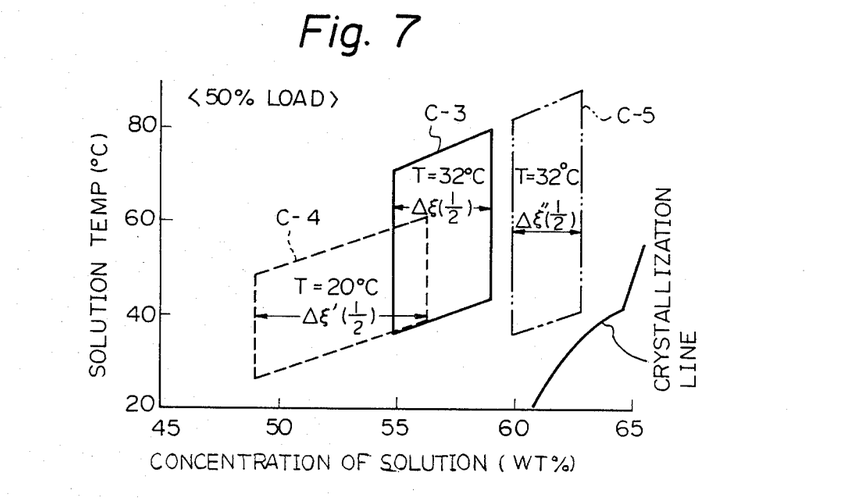
FIG. 7 is a graph illustrating refrigeration cycles obtained by the solution control of the present invention under a partial load of fifty percent.

FIGS. 6 and 7 show examples of refrigeration cycles which are obtained by the solution flow characteristics shown in FIG. 3 in accordance with the solution control of this invention.

Particularly, FIG. 6 depicts two different refrigeration cycles under full refrigeration load. C-1 denotes a cycle which is obtained when the temperature of cooling water entering (such as supplied to the absorber heat exchanger 31 in FIG. 1) is 32° C. C-2 denotes a cycle as obtained when the temperature of cooling water entering is 20° C.

It will be appreciated that the cycle C-2 has a greater difference in concentration of solution ($\Delta\xi'$) than that ($\Delta\xi$) of the cycle C-1. This indicates that the valve allows a flow of solution which is more restricted than the flow of solution as experienced in the cycle C-1. The increment of solution difference between the strong solution and the weak solution serves to increase the efficiency of the system.

Turning to FIG. 7, there are shown three refrigeration cycles under a partial load of 50%. C-3 denotes a refrigeration cycle when the temperature of cooling water entering (T) is 32° C. C-4 denotes a cycle at T=20° C. with a concentration of difference of $\Delta\xi'(\frac{1}{2})$ much greater than $\Delta\xi(\frac{1}{2})$ as experienced in the cycle C-3 at T=32° C. C-5 is a cycle at T=32° C. when some non-condensed gas (e.g. air) has leaked into the refrigeration system.

Figure 8:
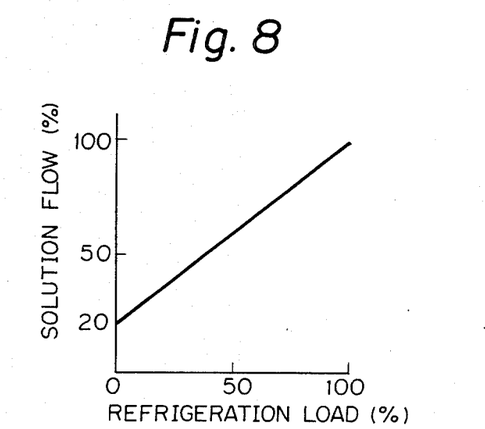
FIG. 8 is a graph illustrating an example of flow characteristics obtained by the prior art solution control.

Referring to FIG. 8, there is shown a typical example of solution flow characteristics which are obtained by the prior art solution control such as disclosed in U.S. Pat. No. 3,550,391. This control varies the flow of weak solution in accordance with the refrigeration load. It will be appreciated from FIG. 8 that the solution flow increases in proportion to the refrigeration demand.

Figure 9:
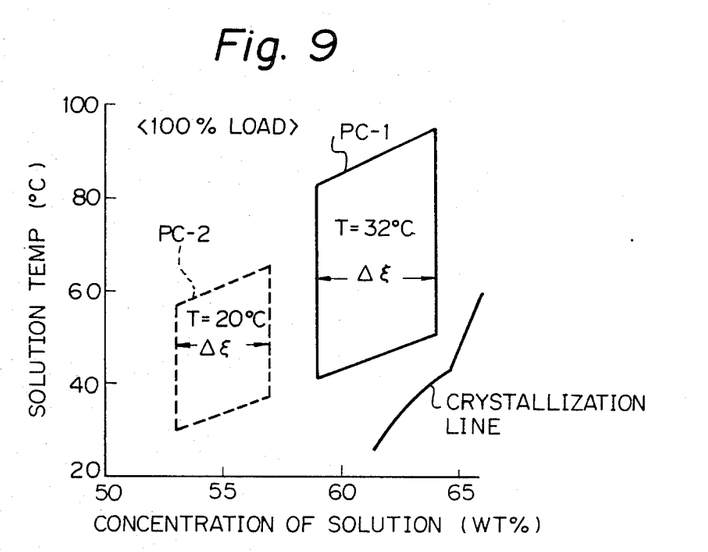
FIG. 9 is a graph illustrating refrigeration cycles obtained by the prior art solution control under full refrigeration load.
Figure 10:
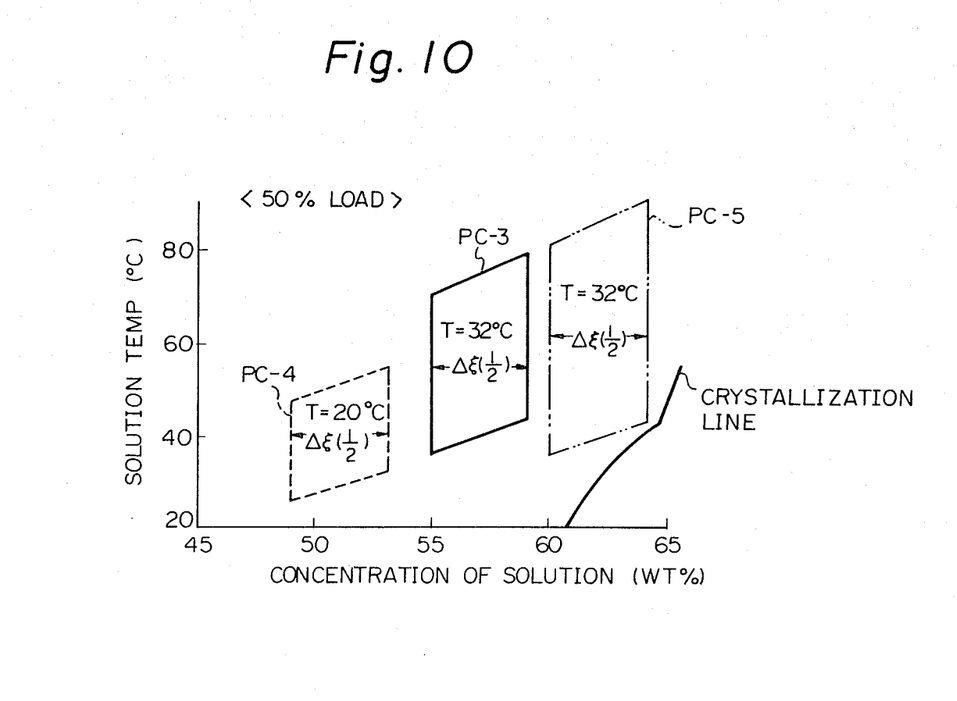
FIG. 10 is a graph illustrating refrigeration cycles obtained by the prior art solution control under a partial load of fifty percent.

FIGS. 9 and 10 show examples of refrigeration cycles which are obtained by the flow characteristics shown in FIG. 8 in accordance with the prior art solution control.

FIG. 9 shows two different refrigeration cycles under full refrigeration load. PC-1 is a cycle which is obtained when the temperature of cooling water entering as supplied to the absorber heat exchanger is 32° C. It should be noted that the cycles C-1 and PC-1 are chosen by design to be identical with each other. PC-2 is a cycle which is obtained when the temperature of cooling water entering (T) is 20° C. It will be appreciated that the concentration difference as experienced by the cycle PC-2 at T=20° C. is the same as that of the cycle PC-1 at T=32° C. This is because the solution control used therefor depends only on the refrigeration load and does not depend on the concentration of the solution.

It will now be understood that the solution control of this invention provides an improved efficiency of the system as compared with the prior art solution control. More specifically, the cycle C-2 obtained by the solution control of this invention indicates a greater efficiency than the efficiency as indicated by the cycle PC-2 obtained by the prior art solution control under the same system conditions, i.e. 100% load and T=20° C.

FIG. 10 shows three different refrigeration cycles under a partial load of 50%. PC-3 is a cycle obtained at T=32° C. PC-4 is a cycle when T is 20° C. and indicates less efficiency of the system than that achieved by the cycle C-4 at T=20° C. by the solution control of this invention.

PC-5 is a cycle which is obtained under the same conditions as the cycle C-5 in FIG. 7, that is when the temperature of cooling water entering (T) is 32° C. and some non-condensed gas has leaked into the refrigeration system. Since the prior art solution control depends only on the load, the difference of solution at a given load has a constant value $\xi(\frac{1}{2})$ irrespective of the temperature of cooling water entering supplied to the absorber heat exchanger. As a result, the cycle PC-5 with some introduction of non-condensed gas in the system is quite close to a crystallization line.

In contrast, the cycle C-5 obtained by the solution control of this invention under the same condition provides a safety factor by being separated from the crystallization line. It will now be understood that the solution control in accordance with the present invention is safer from the risk of crystallization of the solution.

Whereas preferred embodiments have been shown and described, it should be construed that various other modifications and variations can be made without departing from the spirit and scope of the present invention, as defined in the appended claims.

What is claimed is:

1. An absorption refrigeration system including a refrigerant evaporator, an absorber associated with said evaporator, a generator, a condenser associated with said generator, weak solution passage means for passing a weak solution to said generator from said absorber, strong solution passage means for passing a strong solution to said absorber from said generator, refrigerant passage means for circulating refrigerant through said evaporator, refrigerant return passage means for passing refrigerant from said condenser back to said evaporator, heating medium passage means for passing heating medium to said generator, heating control means for controlling said heating medium, a solution heat exchanger disposed in said strong solution passage means for preheating said weak solution passing therethrough, and solution flow control means for controlling the flow of said weak solution passing through said weak solution passage means, wherein said solution flow control means comprises sensing means for sensing the level of solution in said absorber indicative of the concentration of the solution in substantially inverse proportional relationship, and valve means disposed in said weak solution passage means through which said weak solution passes and responsive to said sensing means for varying the flow of said weak solution in such a manner that the flow of said weak solution decreases as the level of the solution in the absorber increases, which indicates a decreased concentration of the solution.

2. An absorption refrigeration system as defined in claim 1, wherein said sensing means comprises a float.

3. An absorption refrigeration system as defined in claim 1, wherein said sensing means comprises a float, and said solution control means further comprises actuator means for receiving the signal from said float and for positioning said valve means.

4. An absorption refrigeration system as defined in claim 1, wherein said control means is fully enclosed by said absorber of air-tight type, whereby said control means does not need to meet the requirement of having an air-tight structure.

5. An absorption refrigeration system as defined in claim 4, wherein said control means comprises a float as said sensing means and a rod mechanically and drivingly connecting said float to said valve means so that the buoyancy of said float can directly position said valve means.

6. An absorption refrigeration system as defined in claim 1, wherein said absorption refrigeration system is of a single effect type having a single generator.

7. An absorption refrigeration system as defined in claim 1, wherein said absorption refrigeration system is of a double effect type having a primary generator and a secondary generator.

8. A solution flow control for an absorption refrigeration system including a refrigerant evaporator, an absorber associated with said evaporator, a generator, a condenser associated with said generator, weak solution passage means for drivingly passing a weak solution to said generator from said absorber, strong solution passage means for passing a strong solution to said absorber from said generator, refrigerant circulating means for forcibly circulating refrigerant through said evaporator, refrigerant return passage means for passing refrigerant from said condenser back to said evaporator, heating medium passage means for passing heating medium to said generator, and heating energy control means for controlling said heating medium, said control means comprising:

(a) sensing means for sensing the level of the solution in said absorber; and (b) valve means responsive to said sensing means for varying the flow of the weak solution passing therethrough in such a manner that the flow of said weak solution increases in response to a decreasing level of the solution in the absorber indicative of an increased concentration of the solution, whereas the flow of said weak solution decreases in response to an increasing level of the solution in the absorber indicative of a decreased concentration of the solution, said valve means being disposed in said weak solution passage means through which passes said weak solution, thereby establishing a relatively high efficiency of the refrigeration system while assuring safety from the risk of crystallization of the solution which would be caused by over-concentration of the solution at a restricted flow of the solution.

9. A solution flow control as defined in claim 8, wherein said absorption refrigeration system is of a double effect type having a primary high temperature generator and a second low temperature generator wherein said primary generator is connected to said absorber through second weak solution passage means for passing a weak solution to said primary generator, and refrigerant vapor passage means is adapted to pass refrigerant vapor to said second generator as heating medium for the solution therein, a second strong solution passage is adapted to pass a strong solution from said primary generator to said evaporator, and wherein the flow of a weak solution passing through said second weak solution passage is not controlled by said solution control but is controlled by a float-valve control associated with said primary generator, said float-valve control being adapted to maintain the level of the solution in said primary generator.

10. A solution control as defined in claim 8, wherein said level sensing means comprises a float.

11. A solution control as defined in claim 8, wherein said solution control is fully enclosed by said absorber of air-tight structure so that a slight fluid leakage from said solution flow control is acceptable to the refrigeration system.

12. A solution flow control as defined in claim 11, wherein said level sensing means comprises a float, and said solution flow control further comprises a rod mechanically and drivingly coupling said float with said valve means so that said float functions as an actuator for said valve means by directly transmitting its buoyancy to position said valve means.

13. An absorption refrigeration system as defined in claim 2, wherein said absorption refrigeration system is of a single effect type having a single generator.

14. An absorption refrigeration system as defined in claim 3, wherein said absorption refrigeration system is of a single effect type having a single generator.

15. An absorption refrigeration system as defined in claim 4, wherein said absorption refrigeration system is of a single effect type having a single generator.

16. An absorption refrigeration system as defined in claim 5, wherein said absorption refrigeration system is of a single effect type having a single generator.

17. An absorption refrigeration system is as defined in claim 2, wherein said absorption refrigeration system of a double effect type having a primary generator and a secondary generator.

18. An absorption refrigeration system as defined in claim 3, wherein said absorption refrigeration system is of a double effect type having a primary generator and a secondary generator.

19. An absorption refrigeration system as defined in claim 4, wherein said absorption refrigeration system is of a double effect type having a primary generator and a secondary generator.

20. An absorption refrigeration system as defined in claim 5, wherein said absorption refrigeration system is of a double effect type having a primary generator and a secondary generator.

21. A solution control as defined in claim 9, wherein said level sensing means comprises a float.

* * * * *